(12) United States Patent
Patel

(10) Patent No.: US 6,775,743 B2
(45) Date of Patent: Aug. 10, 2004

(54) CONTENT CACHING WITH SPECIAL HANDLING OF MULTIPLE IDENTICAL REQUESTS FOR CONTENT

(75) Inventor: Burzin Patel, Miami Lakes, FL (US)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 09/952,291

(22) Filed: Sep. 12, 2001

(65) Prior Publication Data

US 2003/0051100 A1 Mar. 13, 2003

(51) Int. Cl.[7] ............................................. G06F 12/00
(52) U.S. Cl. ...................... 711/118; 711/113; 711/154
(58) Field of Search ................................. 711/118, 113, 711/154; 709/219, 245

(56) References Cited

U.S. PATENT DOCUMENTS

| | | | |
|---|---|---|---|
| 6,199,107 B1 * | 3/2001 | Dujari | 709/219 |
| 6,249,844 B1 * | 6/2001 | Schloss et al. | 711/122 |
| 6,351,767 B1 * | 2/2002 | Batchelder et al. | 709/219 |
| 6,370,571 B1 * | 4/2002 | Medin, Jr. | 709/218 |
| 6,427,187 B2 * | 7/2002 | Malcolm | 711/119 |
| 6,587,928 B1 * | 7/2003 | Periyannan et al. | 711/138 |
| 2002/0048269 A1 * | 4/2002 | Hong et al. | 370/389 |
| 2002/0062372 A1 * | 5/2002 | Hong et al. | 709/225 |

OTHER PUBLICATIONS

Fielding et al., "Hypertext Transfer Protocol—HTTP/1.1," RFC 2616, pp. 1–114, The Internet Society, Jun. 1999.*
Wessels et al., "Internet Cache Protocol (ICP), Version 2," RFC 2186, Network Working Group, pp 1–9, Sep. 1997.*
Wessels et al., "Application of Internet Cache Protocol (ICP), Version 2," RFC 2187, Network Working Group, pp 1–24, Sep. 1997.*

* cited by examiner

*Primary Examiner*—Matthew Kim
*Assistant Examiner*—Stephen Elmore
(74) *Attorney, Agent, or Firm*—Law Offices of Michael Dryja

(57) ABSTRACT

The special handling of multiple identical requests for the content during content caching is disclosed. A request for content, such as a web page request received from a client, is received. At least one of two actions is then performed. First, in response to determining that the content is cacheable and that a previous request for the content has already been forwarded to a server responsible for the content, such as a web server, the request is not processed until a response to the previous request is received. Second, in response to determining that the content is non-cacheable, the request is forwarded to the server responsible for the content.

18 Claims, 5 Drawing Sheets

CONTENT CACHING WITH SPECIAL HANDLING OF MULTIPLE IDENTICAL REQUESTS FOR CONTENT

BACKGROUND OF THE INVENTION

1. Technical Field

This invention relates generally to content caching, such as caching web pages in the context of web servers on the Internet. More particularly, the invention relates to such caching where multiple requests for the same content from the caching server to the content server(s) are specially handled.

2. Description of the Prior Art

Web browsing on the Internet is perhaps one of the most popular applications of the Internet. Using a web browser program on a client, a user enters in the address of a web site or web page hosted by one or more web servers. The client contacts these web server(s) at this address on the Internet, which is known as a universal resource locator (URL) address. This address typically has the form "http://www.name.suffix/page.htrnl," where the suffix may be "corn," "org," or another suffix. The web server receives the request, and returns content to the client identified by the address. Once the client receives the content, the web browser program interprets it to properly display the content to the user.

A difficulty that has become apparent when using web servers to host web sites is that a web server usually only has the capability of serving so many web pages at a time. For instance, a web server may have the ability to handle 1,000 web page requests per second. However, as the popularity of a web site increases, the web server may have to handle more than its original capability of web page requests. Typical solutions have centered around implementing scalable servers, which can be expanded as need warrants, as well as adding additional web servers, which can be clustered with the original server(s) so that proper load balancing is achieved.

A more recent solution that has seen increased usage is employing a caching server. A caching server is usually located in front of the web server, and may handle incoming web page requests directly from clients, passing on requests to the web server only when necessary. The caching server caches content according to a predetermined approach, such that the caching server can respond to client requests for content that has been cached without passing the requests along to the web server. This alleviates much of the burden placed on the web server, effectively allowing the web server to handle more client requests than if the caching server were not used.

Content typically can be classified as either cacheable or non-cacheable. Cacheable content is generally that which is not particular to a given user's request, and that does not require customization by the web server to properly respond to the user's request. For instance, a news-oriented web site may have content regarding a breaking news story. Regardless of the client that requests this content, the web site returns the same content. Therefore, this content is cacheable, in that the caching server is able to cache the content and return it to any requesting client.

By comparison, non-cacheable content is generally that which is particular to a given user's request, and thus requires customization by the web server to properly respond to the user's request. For instance, a banking web site may have content directed to each of its account holder's accounts. When a client requests account-related content from the site, the content is not applicable to any other client, since each client will request account-related content of its own user. Therefore, this content is non-cacheable, in that the caching server should not cache the content.

A problem with caching servers, however, occurs when multiple client requests for the same content are retrieved in a short time span, before the web server responsible for the content has responded to the first such request. For example, the caching server may receive a client request for cacheable content that has not yet been cached, and pass it along to the web server. Before the caching server receives the content from the web server to cache and return to the requesting client, the caching server receives one or more additional client requests for the same content. Because this content has not yet been cached, the caching server passes along these requests, too, to the web server.

The web server in this scenario is therefore burdened with having to respond to essentially the same request for content a number of times, in contradistinction to the purpose of having a caching server offload this burden from the web server. With each additional client request for the same content passed along to the web server before the web server responds to the original request for the content, the web server's ability to handle any request for content for which it is responsible decreases. That is, with each additional client request that it receives for the same content, there is a longer delay in the web server responding to the initial client request for this content.

This effect is known generally as the positive feedback, or snowball effect, in that the more client requests the web server receives, the worse its performance becomes. Existing caching servers assume that this situation will occur with sufficiently low frequency that it does not affect the ability of the web server to handle content requests. However, this assumption is at best dubious, and even if this scenario occurs infrequently, when it does, it can greatly degrade web server performance, to the detriment of the users and the operator of the web site. For these described reasons, as well as other reasons, there is a need for the present invention.

SUMMARY OF THE INVENTION

The invention relates to special handling of multiple identical requests for content during content caching. A method of the invention receives a request for content. The method performs at least one of two actions. First, in response to determining that the content is cacheable and that a previous request for the content has already been forwarded to a server responsible for the content, the method waits to process the request until it receives a response to the previous request. Second, in response to determining that the content is non-cacheable, the method forwards the request to the server responsible for the content.

A system of the invention includes first and second storages, and a mechanism. The first storage stores cacheable content by identifiers thereof, where the cacheable content is received from one or more content servers. The second storage tracks outstanding requests for content that have been sent to the content servers, by identifiers of the content. The mechanism receives a new request for content that includes an identifier. In response to determining that the second storage is tracking other request(s) also having the identifier of the new request, the mechanism adds the new request to these other request(s) in the second storage.

An article of manufacture of the invention includes a computer-readable medium and means in the medium. The means in the medium is for waiting to process a received request for content, until a response is received to another request for the content that has already been sent to a server responsible for the content. The means is also for forwarding the received request to the server after determining that the content is non-cacheable. Other features and advantages of the invention will become apparent from the following detailed description of the presently preferred embodiment of the invention, taken in conjunction with the accompanying drawings.

DESCRIPTION OF THE PREFERRED EMBODIMENT

Overview

Figure 1:
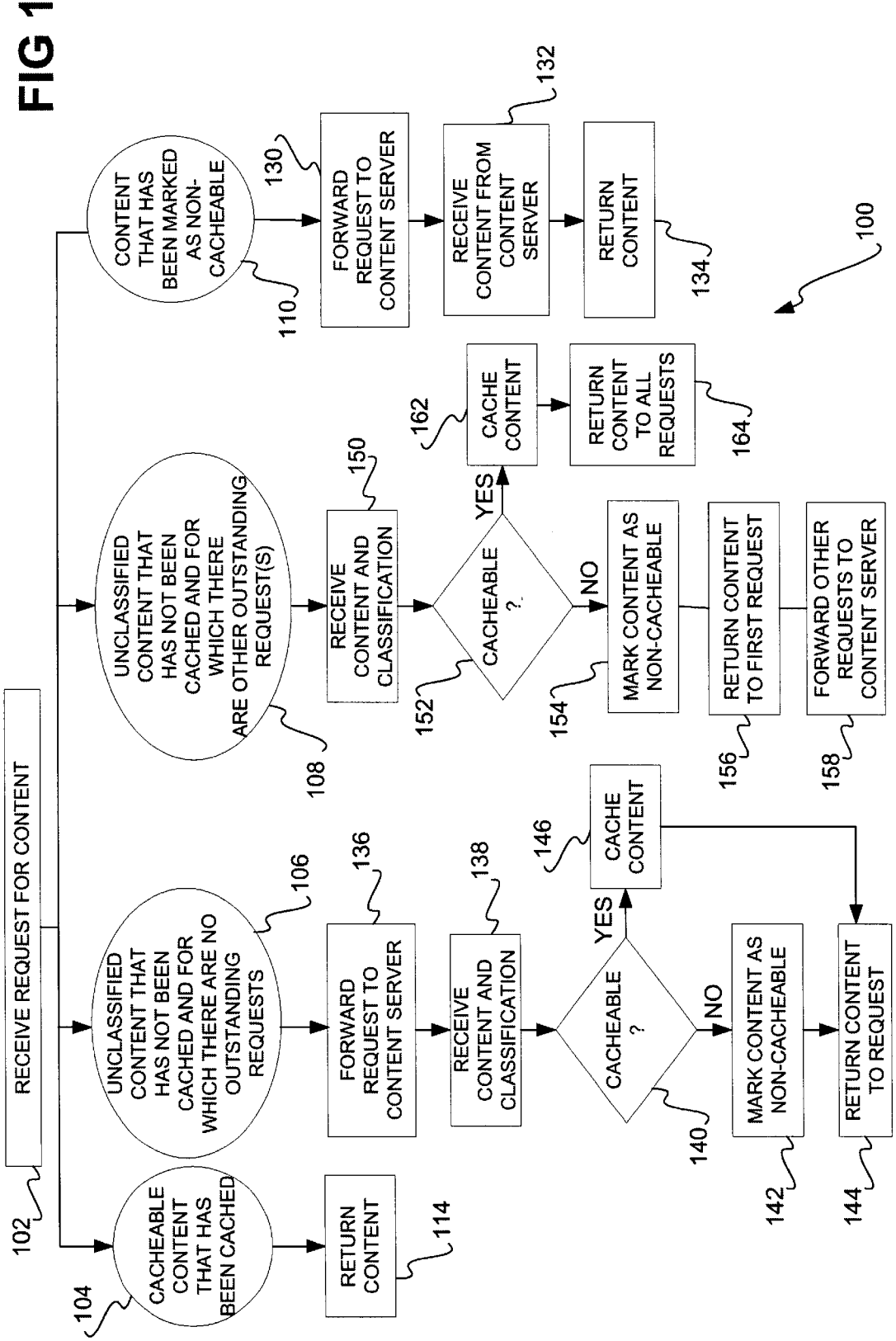
FIG. 1 is a flowchart of a method according to a preferred embodiment of the invention, and is suggested for printing on the first page of the issued patent.

FIG. 1 shows a method 100 according to a preferred embodiment of the invention. Along with other methods of the invention, the method 100 may be performed by a caching server that receives client requests for content, and that passes at least some of these requests to one or more content servers, such as web servers. The method 100 further may be implemented by one or more means stored on a computer-readable medium of an article of manufacture. The medium may be a recordable data storage medium, a modulated carrier signal, or another type of medium.

A request for content is first received (102). The content may be a web page, a web object, or another type of content. The request may be received over the Internet, or over one or more other types of networks in addition to or in lieu of the Internet. Depending on the type of content that has been requested, one of four different actions can be performed. Such actions include those that correspond to cacheable content that has already been cached (104), as well as unclassified content that has not been cached but for which no other outstanding requests have been made (106). The actions also include those that correspond to unclassified content that has not been cached and for which other outstanding requests have been made (108), and non-cacheable content, or more specifically content that has been marked as non-cacheable (110). With respect to cacheable content that has already been cached (104), the cached content is returned in response to the received request (114). That is, because a local copy of the content that has been requested is available, the content is returned.

With respect to unclassified content that has not yet been cached, and for which there are no other outstanding requests for the content (106), this is content that has not been cached, and no previous requests for the same content are outstanding to the content server. The request for the content is forwarded to the content server (136), and the content, along with an indication as to whether the content is cacheable or non-cacheable, are received back from the content server (138). If this classification indicates that the content is not cacheable (140), then the content is marked as non-cacheable for future reference (142), and is returned in response to the received request (144). If this classification indicates that the content is cacheable (140), then the content is cached (146), and returned in response to the received request (144).

With respect to cacheable content that has not yet been cached, and for which there are outstanding requests for the content (108), this is content that has not been cached, but one or more previous requests for the same content have already been made, where the first request was earlier forwarded to the content server. Therefore, the most recently received request is not forwarded to the content server. Rather, the content is received from the content server in response to the first request for the same content, along with an indication as to whether the content is cacheable or non-cacheable (150). If the classification indicates the content is cacheable (152), the content is cached (162) and returned in response to all the pending requests for the content (164), including the most recently received request. If the classification indicates that the content is instead non-cacheable (152), the content is marked as non-cacheable (154), and is returned only in response to the first request (156). The other pending requests are forwarded to the content server (158). Finally, with respect to content that has been marked as non-cacheable (110), the request is forwarded to the content server (130). The content is received from the content server (132). The content is then returned in response to the request (134).

Technical Background

Figure 2:
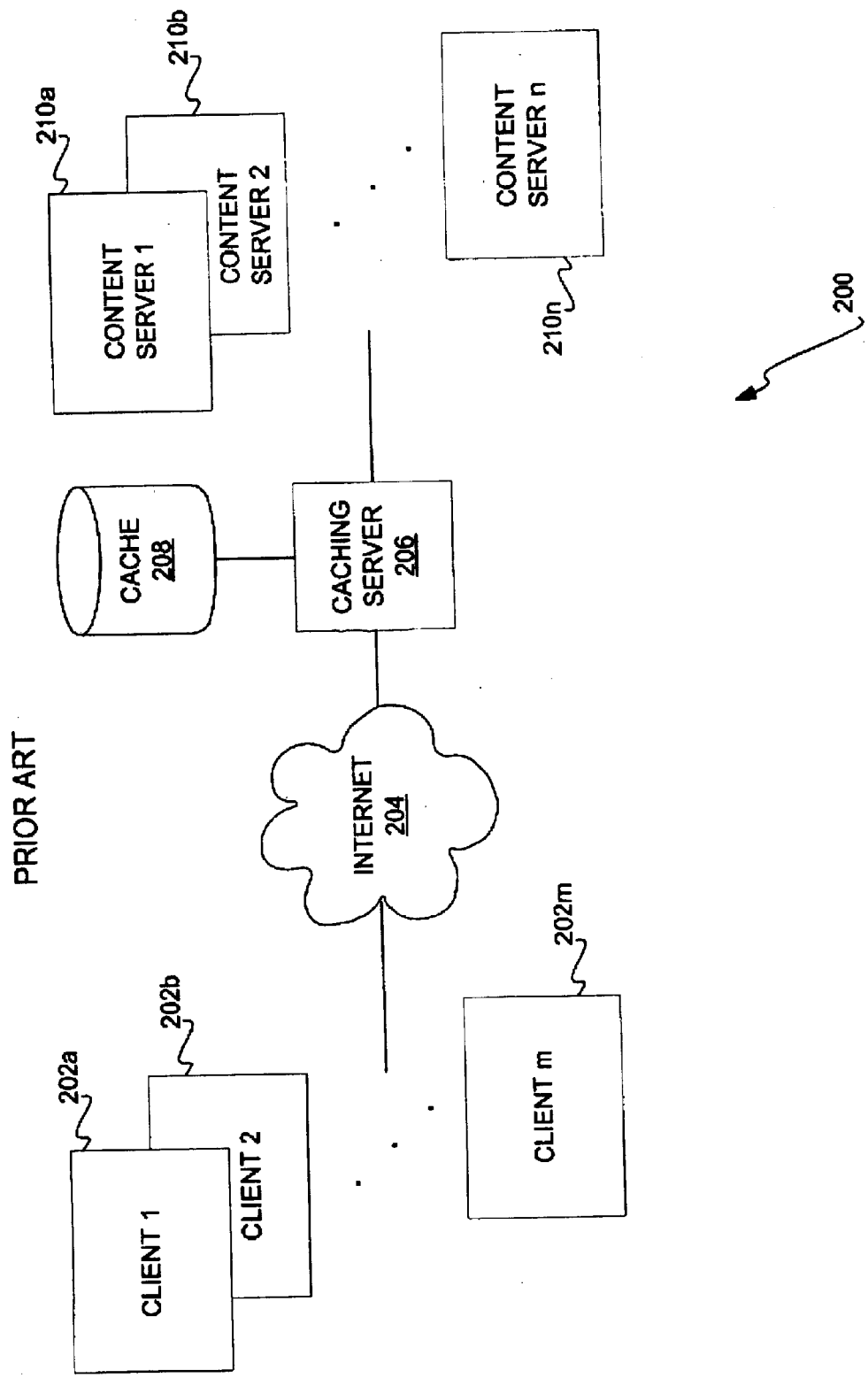
FIG. 2 is a diagram of a system in conjunction with which embodiments of the invention can be implemented.

FIG. 2 shows an example system 200 in conjunction with which embodiments of the invention may be implemented. The system 200 includes a number of clients 202a, 202b, ..., 202n. These clients 202 are typically computers or computerized devices on which web browser programs are running, such that they can generate requests for content, and receive the content back for proper interpretation and display to their users. The requests may be requests for web pages or other content addressable by universal resource locator (URL) addresses, as commonly found on the Internet's world wide web. The URL addresses are more generally referred to as identifiers.

The system 200 includes the Internet 204, to which the clients 202 and a caching server 206 are communicatively coupled. The Internet 204 is generally one type of network. Other types of networks that are amenable to the invention in addition to or in lieu of the Internet 204 include intranets, extranets, virtual private networks (VPNs), wide-area networks (WANs), and local-area networks (LANs). The caching server 206 is shown on the side of content servers 210a, 210b, ..., 210n of the system 200. However, alternatively the caching server 206 may be located on the side of the clients 202, between the clients 202 and the Internet 204.

The caching server 206 generally initially handles content requests received from the clients 202. If the content requests relate to content that the caching server 206 has previously cached in the cache 208, then the caching server 206 returns the cached content to the requesting clients without involving the content servers 210. However, if the content requests relate to content that the caching server 206 has not stored in the cache 208, then the caching server 206 passes the requests to one or more of the content servers 210.

The caching server 206 may determine to which of the content servers 210 to pass the requests, or it may allow one or more of the content servers 210 themselves to determine which among them should handle the requests. The content servers 210 can more specifically be web servers.

In either case, the caching server 206 receives the content back from the servers 210, and returns the content back to the client of the clients 202 that had made the request. Those of ordinary skill within the art can appreciate that the description of the system 200 is for summary purposes only, and that other aspects of such systems not disclosed herein are still amenable to the invention. For instance, the cached content stored in the cache 208 may have time-to-live (TTL) markers as well as other attributes. The content servers 210 may be load balanced, or be consistent with other such algorithms and approaches.

Caching Server

Figure 3:
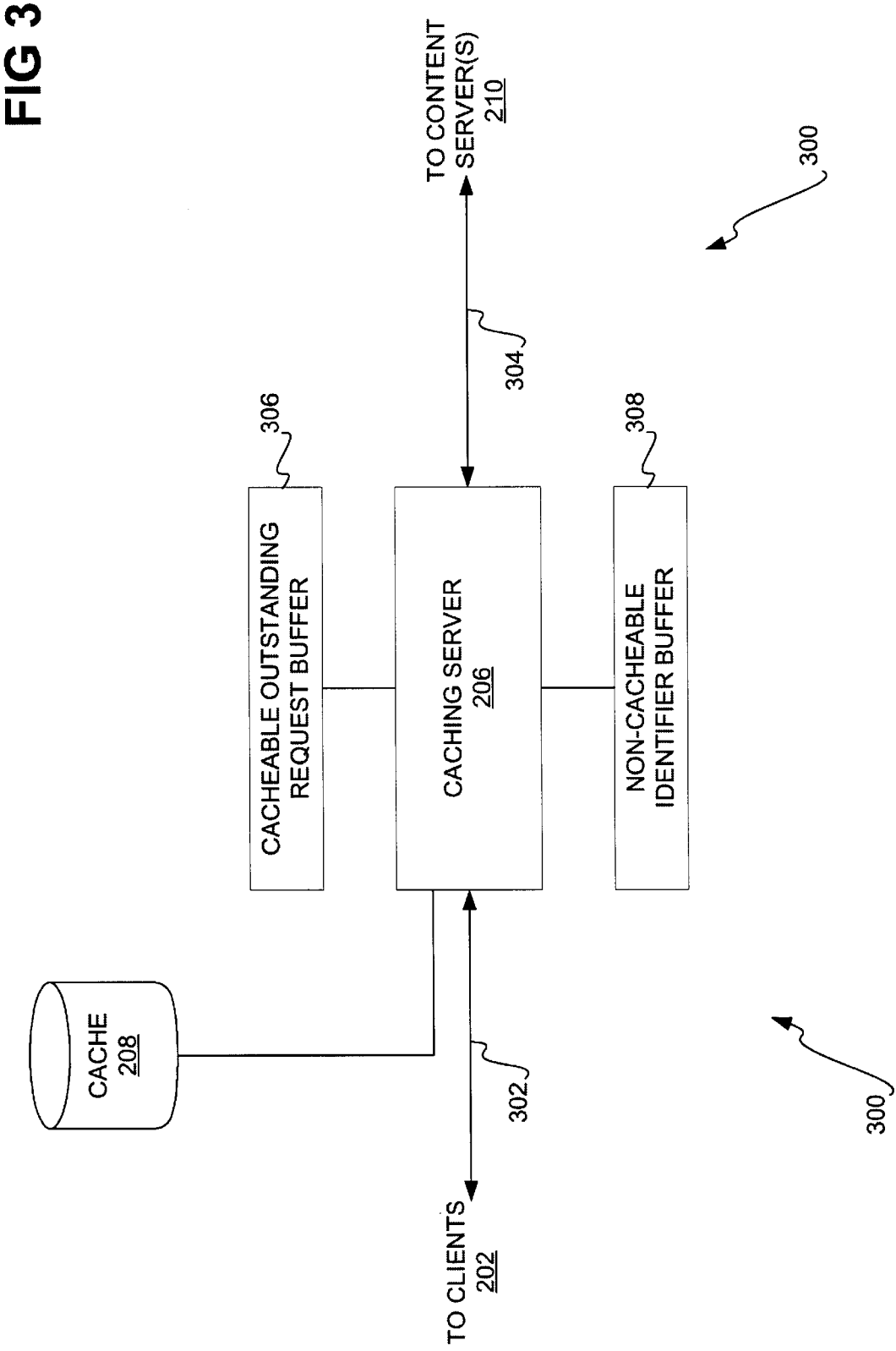
FIG. 3 is a diagram of a caching server and associated components, according to an embodiment of the invention.

FIG. 3 shows a system 300 of the caching server 206 and its associated components in more detail, according to an embodiment of the invention. These components include the cache 208, a cacheable outstanding request buffer 306, and a non-cacheable identifier buffer 308. Any or all of these components may be part of the caching server 206 itself. The server 206 may be a general-purpose computer programmed to perform functionality according to an embodiment of the invention, a hardware device specifically designed to perform such functionality, and so on. The server 206 is generally a mechanism that performs this functionality, or may include a mechanism, such as a particular piece of hardware or software, that performs this functionality.

As indicated by the lines 302 and 304, the server 206 can communicate with the clients 202 and the content servers 210, respectively. The cache 208 stores cacheable content received from the content servers 210, such that the caching server 206 is able to use such locally stored copies of the content to return in response to requests for such content from the clients 202. The cache 208 may be one or more hard disk drives, or other types of storage. The buffers 306 and 308 are also more generally referred to as storages.

The cacheable outstanding request buffer 306 tracks requests for content that have been passed by the caching server 206 to the content servers 210, but for which responses have not yet been received from the content servers 210. The buffer 306 may be a bit-wise buffer implemented in hardware, a software-implemented buffer, or another type of buffer. By checking the buffer 306 before forwarding a request for content to the content servers 210, the caching server 206 is able to avoid sending duplicate requests for the same content to the servers 210, such that overburdening the servers 210 can be avoided.

The buffer 306 preferably stores the outstanding requests for content for which one such request has already been forwarded to the content servers 210 using lists organized by identifiers, such as URL addresses at which the content is located. For instance, for an initial request forwarded to the content server 210, the buffer 306 stores the identifier and begins a list associated with this identifier that has the initial request as its first entry. Subsequent requests for the same content received by the caching server 206 before the response to the initial request is received from the servers 210 are then added in order to this list. When the content is then received back from the servers 210, the list of request(s) in the buffer 306 for this content is removed.

The non-cacheable identifier buffer 308 tracks content that is non-cacheable. The buffer 308 may also be a bit-wise buffer implemented in hardware, a software-implemented buffer, or another type of buffer. The buffer 308 preferably tracks such content by identifiers, such as URL addresses at which the content is located. By checking the buffer 308, the caching server 206 is able to determine whether the content requested by a client is non-cacheable.

Thus, if the content is non-cacheable, the caching server 206 immediately forwards the request to the content servers 210. This occurs even though another, previously made request having the same identifier may have been forwarded to and to which the content servers 210 have not responded. This is because the content that the servers 210 ultimately return in response to such requests for non-cacheable content may, for instance, be customized for the individual clients making such requests, such that the content returned to the clients is not identical.

Handling of Requests for Content

Figure 4:
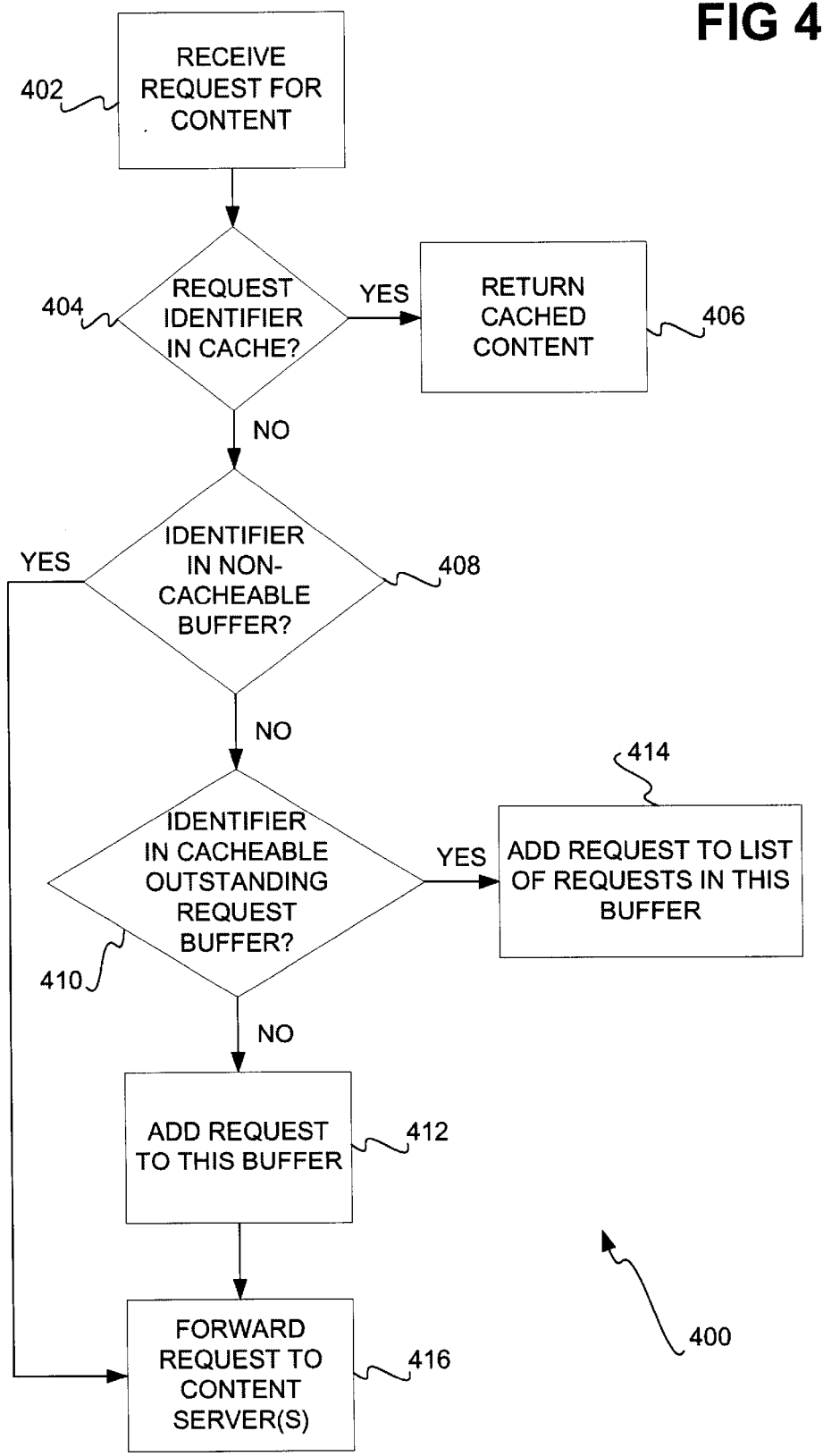
FIG. 4 is a flowchart of a method showing how one embodiment of the invention processes requests received for content.

FIG. 4 shows a method 400 according to which one embodiment of the invention handles requests for content received from clients. The method 400 is consistent with the method 100 of the preferred embodiment of the invention. First, a request for content is received (402) that includes an identifier, such as the URL address at which the content is located. If the requested content is in the cache (404), then the cached content is returned to the requesting client (406). If the requested content is not in the cache (404), however, then the method 400 determines if the identifier is in the non-cacheable buffer (408).

If so, then the request is forwarded to one or more of the content servers (416). Otherwise, the method 400 determines whether the identifier is in the cacheable outstanding request buffer (410). If the identifier is in this buffer, then the currently received request is added to the list of identical requests stored in the buffer (414), and the method 400 ends. However, if the identifier is not in this buffer, then the request is added to the buffer as the first entry of a new list in the buffer associated with the identifier (412). The request is then forwarded to one or more of the content servers (416).

Handling of Responses

Figure 5:
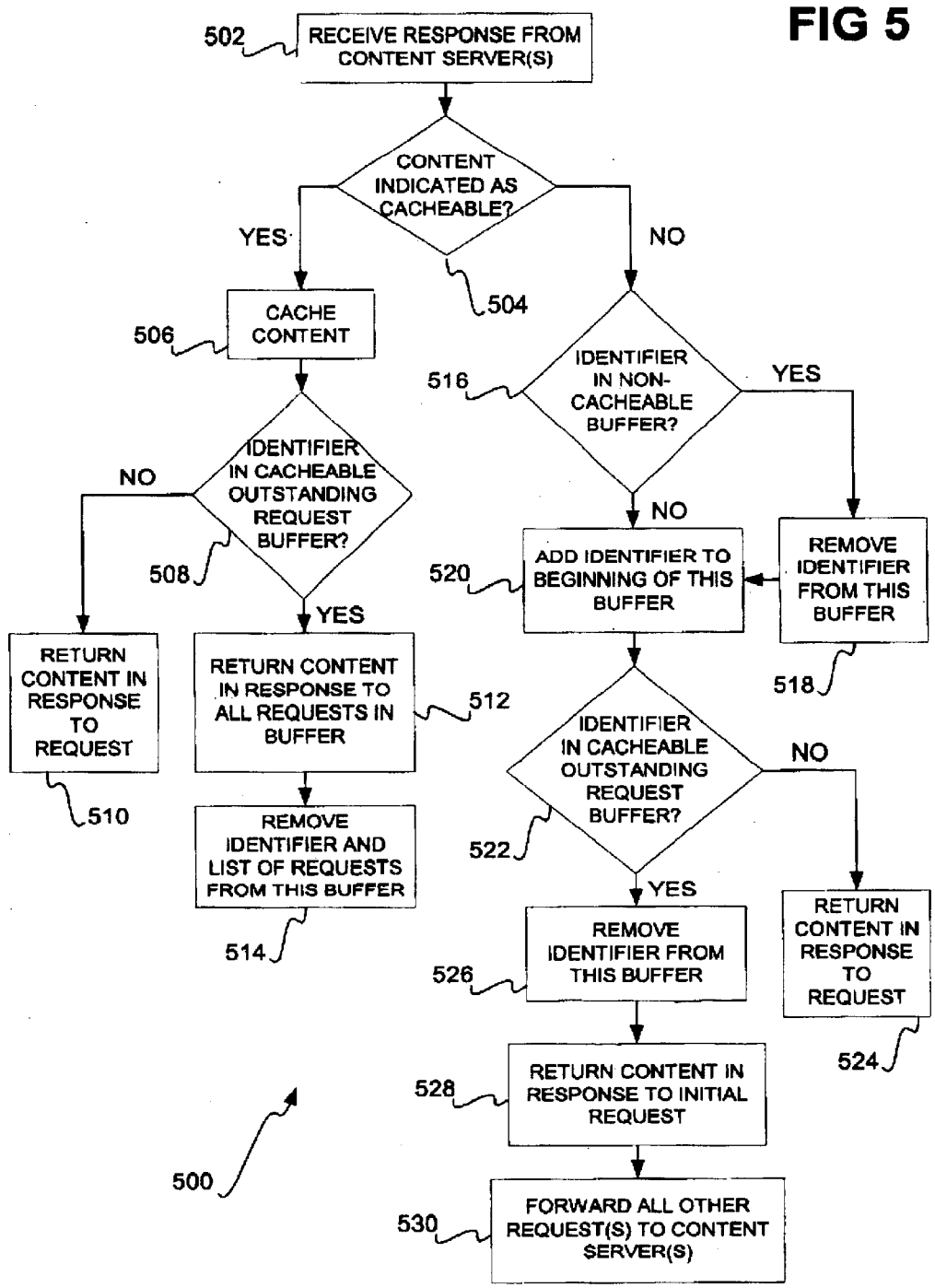
FIG. 5 is a flowchart of a method showing how one embodiment of the invention processes responses received from content server(s).

FIG. 5 is a flowchart of a method 500 according to which one embodiment of the invention handles responses received from content servers in response to previously forwarded content requests. The method 500 is consistent with the method 100 of the preferred embodiment of the invention. First, a response from a content server is received (502) that includes content, an identifier for the content, and an indication as to whether the content is cacheable or non-cacheable.

If the content is indicated as cacheable (504), then the method 500 caches the content (506), and determines whether the identifier is in the cacheable outstanding request buffer (508). If not, then the content is returned in response to the request for the content (510). If so, however, then the content is returned in response to all the requests for the content in this buffer (512), and the identifier and its associated list of requests are removed from the buffer (514).

However, if the content is indicated as non-cacheable (504), then the method 500 determines whether the identifier is in the non-cacheable buffer (516). If it is, then the identifier is initially removed from the buffer (518), and re-added to the buffer at the beginning of the buffer (520). The identifier is also added to the beginning of the buffer where the identifier was not found in the non-cacheable buffer (520). Next, the method 500 determines whether the identifier is in the cacheable outstanding request buffer (522). If not, then the content is returned in response to the request for the content (524).

Otherwise, the identifier and its associated list of requests are removed from this buffer (526), and the content is returned in response to the initial request for this content that was originally forwarded to the content servers (528). All other requests for this content that were in the list stored in the buffer associated with the identifier are then forwarded to the content server(s) (530). Because the content is non-cacheable, the same content that was returned in response to the initial request for the content that had been forwarded to the content server(s) cannot be returned in response to the other requests.

Advantages over the Prior Art

Embodiments of the invention allow for advantages over the prior art. When a caching server according to an embodiment of the invention receives a request for cacheable content that has not yet been cached, but for which an earlier request has already been forwarded to a content server, the caching server does not also forward the current request to the content server. Rather, the caching server waits to process the current request until a response to the earlier request has been received, and then returns the content received from the content server in response to both such requests. In this way, the caching server avoids overburdening the content server with duplicate requests for the same cacheable content. The caching server thus prevents the positive feedback effect that may otherwise occur when the content server receives such duplicate requests.

Furthermore, when a caching server according to an embodiment of the invention receives a request for non-cacheable content, it automatically forwards the request to the content server. This ensures that embodiments of the invention can be used in situations where both non-cacheable and cacheable content are being served by a content server. Requests for non-cacheable content, such as dynamic content, are not blocked by the caching server, even if previous, identical requests for such content have already been forwarded to the content server. In this way, responsiveness to requests for non-cacheable content is not degraded.

Alternative Embodiments

It will be appreciated that, although specific embodiments of the invention have been described herein for purposes of illustration, various modifications may be made without departing from the spirit and scope of the invention. For instance, whereas the invention has been substantially described in relation to caching servers operating in conjunction with content servers that are web servers, and for content that includes web pages, the invention itself is not so limited. The invention is also applicable, for example, to other types of content servers, and other types of content besides web pages, and in other environments besides Internet-oriented environments.

As another example, buffers besides those described herein may be used in conjunction with the invention. For instance, there may only be a single buffer that tracks outstanding requests made to the content servers. The purpose of the non-cacheable buffer that has been described can in such instance be instead satisfied by the cache, where if content is not in the cache, it is initially presumed to be non-cacheable. Accordingly, the scope of protection of this invention is limited only by the following claims and their equivalents.

I claim:

1. A method comprising:

receiving a request for content;

performing an action selected from the group of actions essentially consisting of:

in response to determining that the content comprises cacheable content and that a previous request for the content has already been forwarded to a server responsible for the content, waiting to process the request until a response to the previous request has been received;

in response to determining that the content comprises non-cacheable content, forwarding the request to the server responsible for the content;

in response to determining that the content comprises content unclassified as one of cacheable content and non-cacheable content, forwarding the request to the server responsible for the content;

receiving a response to the request from the server responsible for the content, the response including the content and indicating whether the content is one of cacheable and non-cacheable;

returning the content in response to the request; and, where the response to the request from the server responsible indicates that the content is cacheable, caching the content.

2. The method of claim 1, wherein the group of actions further essentially consists of, in response to determining that the content comprises cacheable content that has already been cached, returning the cacheable content that has already been cached in response to the request.

3. The method of claim 1, further comprising, in response to determining that the content comprises content unclassified as one of cacheable content and non-cacheable content, where the response to the request from the server responsible for the content indicates that the content is non-cacheable, marking the content as non-cacheable.

4. The method of claim 1, further comprising, in response to determining that the content comprises cacheable content and that the previous request for the content has already been forwarded to the server responsible for the content, receiving the response to the previous request from the server responsible for the content, the response including the content; and, returning the content in response to the previous request, the request, and any successive requests for the content.

5. The method of claim 4, further comprising, in response to determining that the content comprises cacheable content and that the previous request for the content has already been forwarded to the server responsible for the content, caching the content.

6. The method of claim 1, further comprising, in response to determining that the content comprises non-cacheable content, receiving a response to the request from the server responsible for the content, the response including the content; and, returning the content in response to the request.

7. A content caching system comprising:

a first storage to store cacheable content by identifiers of the cacheable content, the cacheable content received from one or more content servers;

a second storage to track outstanding requests for content sent to the one or more content servers by identifiers of the content; and, a mechanism to receive a new request for content including an identifier, and in response to determining that the second storage is tracking one or more other requests also having the identifier of the new request, adding the new request to the one or more other requests in the second storage.

8. The system of claim 7, wherein the mechanism, in response to determining that the content of the new request is stored in the first storage, retrieves the content from the first storage and returns the content in response to the new request.

9. The system of claim 7, wherein the mechanism further receives a response to the one or more other requests and the new request from the one or more servers including the content, and returns the content in response to each of the one or more other requests and the new request.

10. The system of claim 9, wherein the mechanism further adds the content to the first storage, and removes the one or more other requests and the new request from the second storage.

11. The system of claim 7, further comprising a third storage to list non-cacheable content of the one or more content servers by identifiers of the non-cacheable content.

12. The system of claim 11, wherein the mechanism, in response to determining that the identifier of the new request is listed in the third storage, sends the new request to the one or more content servers, receives a response from the one or more servers including the content, and returns the content in response to the new request.

13. The system of claim 11, wherein the mechanism, in response to failing to locate the identifier of the new request in the first, second, and third storages, adds the identifier to the second storage, and sends the new request to the one or more content servers.

14. The system of claim 13, wherein the mechanism further receives a response from the one or more servers including the content and indicating whether the content is one of cacheable and non-cacheable, returns the content in response to the new request, and removes the identifier and any other identical identifiers for the content from the second storage.

15. The system of claim 14, wherein the mechanism further adds the content and the identifier of the new request to the first storage where the response received from the one or more servers indicates that the content is cacheable, and further adds the content and the identifier of the new request to the third storage where the response received from the one or more servers indicates that the content is non-cacheable.

16. An article comprising:
a computer-readable medium; and,
means in the medium for waiting to process a received request for content until a response is received to another request for the content that has been sent to a server responsible for the content, and for forwarding the received request to the server after determining that the content is non-cacheable.

17. The article of claim 16, wherein the medium is a recordable data storage medium.

18. The article of claim 16, wherein the medium is a modulated carrier signal.

* * * * *